United States Patent [19]

Fujiki

[11] 4,148,028

[45] Apr. 3, 1979

[54] RADAR SYSTEM FOR AN ANTI-COLLISION SYSTEM FOR A VEHICLE

[75] Inventor: Norio Fujiki, Yokohama, Japan

[73] Assignee: Nissan Motor Company, Limited, Japan

[21] Appl. No.: 821,227

[22] Filed: Aug. 2, 1977

[30] Foreign Application Priority Data

Aug. 3, 1976 [JP] Japan .................................. 51-92016

[51] Int. Cl.² ............................................. G08G 5/04
[52] U.S. Cl. .......................... 343/7 VM; 343/112 CA
[58] Field of Search ...................... 343/7 VM, 112 CA

[56] References Cited

U.S. PATENT DOCUMENTS

3,134,100   5/1964   Lakatos ........................ 343/112 CA

Primary Examiner—Maynard R. Wilbur
Assistant Examiner—Richard E. Berger
Attorney, Agent, or Firm—Lowe, King, Price & Becker

[57] ABSTRACT

A pair of antennas mounted on a vehicle receive an echo wave reflected from an obstacle to produce a pair of Doppler signals, the variation of the phase difference of which is used to indicate the direction of the relative movement of the obstacle. The phase difference also represents the difference in propagation lines and is proportional to the relative angular displacement of the obstacle so the rate of variation of relative angular displacement is detectable because the increase and decrease of phase difference negate each other.

13 Claims, 11 Drawing Figures

FIG. 1

FIG. 2
CENTER AXIS

FIG. 3
CENTER AXIS

RADAR SYSTEM FOR AN ANTI-COLLISION SYSTEM FOR A VEHICLE

The present invention relates to a radar system for an anti-collision system of a motor vehicle. The radar system according to the present invention provides accurate target detection which discriminates between targets or obstacles which can possibly collide with the vehicle and those which cause a false alarm, by detecting the momentary rate of variation of the angle which is made between the target and the center axis of the vehicle.

Radar-operated vehicle safety systems generate a collision warning signal representing the imminence of a collision. In the conventional Doppler radar system, a microwave signal is produced and is transmitted from an antenna and is received by the antenna after reflection by a target. The received echo of the microwave signal is used to produce a Doppler signal therefrom, the Doppler signal being amplified by an amplifier and then applied to a danger-indicating circuit in the form of an input signal. The input signal is compared with information signals supplied to said danger-checking circuit, i.e., a signal representative of the distance between the target and the vehicle, a signal representative of the relative velocity of the target and the vehicle, which are both derived from the Doppler signal, a signal representative of the vehicle velocity and a signal representative of the steering angle. When the danger-indicating circuit detects a dangerous situation, the circuit issues a signal which drives an alarm device which issues an alarm.

If a vehicle with the conventional radar system is moving on a road having a certain detection zone ahead, the radar system will detect any kind of target within the zone. Thus when the vehicle is moving on a straight road those targets being on the both side edges like guard rails, road signs and lamp-posts would not be sensed by the radar because they are out of the detection zone. When, however, the vehicle is moving on a curved road some of those targets may be sensed by the conventional radar system as obstacles because some of those targets are within the detection zone though there is almost no possibility of collision.

In order to prevent this kind of miss detection, a method of reducing the effective detection zone of the radar sensor according to the steering angle or the vehicle speed has been proposed. However, the steering angle does not necessarily represent the actual direction of the movement of the vehicle since there is a divergence of operation of steering among individual drivers and the steering angle is sometimes changed to balance the force generated when the vehicle is subjected to a side wind or moves on a banked road. Thus it is difficult to accurately increase or decrease the detection zone of the radar sensor in a definite relation with the steering angle.

Furthermore, decreasing the length or the width of the detection zone can often cause an desirable delay in detecting a genuinely dangerous obstacle. As an example, when a vehicle is moving at a speed of 80 km/h on a curved road whose radius is 250 meters receiving a side acceleration of 0.2 G and when it prevents the radar system of the vehicle from issuing a false alarm by detecting targets which cannot be obstacles, it can be shown that the longitudinal length of the detection zone of the radar sensor will be as short as 25 meters by calculation. That means the particular radar system can detect a dangerous obstacle only after the obstacle enters said detection zone thus making it obvious that this small zone is quite insufficient for practical operation.

It is therefore an object of the present invention to provide a Doppler radar system for an anti-collision system for a vehicle, which provides a large detection zone irrespective to ambient conditions, road conditions, attitude and inclination of the vehicle etc.

Another object of the present invention is to provide a Doppler radar system for an anti-collision system for a motor vehicle which can correctly determine whether the vehicle is approaching a target in a manner that there is impending danger of a collision between the vehicle and the object or not and appropriately issue an alarm signal indicative of the imminence of a collision.

BRIEF DESCRIPTION OF THE DRAWINGS

These and other objects, features and advantages of the invention will be understood from the following description taken in conjunction with the accompanying drawings, in which.

DETAILED DESCRIPTION

Briefly described, according to the present invention, a radar system for an anti-collision system for avoiding a collision of a vehicle with an obstacle ahead thereof detects the rate of variation of the angular displacement of the object from the center axis of the vehicle by detecting the rate of variation of a phase difference between echo waves received by a pair of antennas respectively. It will be understood that a small rate of variation of the angular displacement indicates a high possibility of collision, in other words though a target is detected in the detection zone of the radar sensor if the afore-mentioned rate of variation is large enough the target has no possibility of collision with the vehicle.

The Doppler radar system according to the present invention also provides an accurate detection of the direction of the movement of a target by using said rate of variation of the phase difference so that the radar system can correctly detect an approaching obstacle which is veering back and forth.

Figure 1:
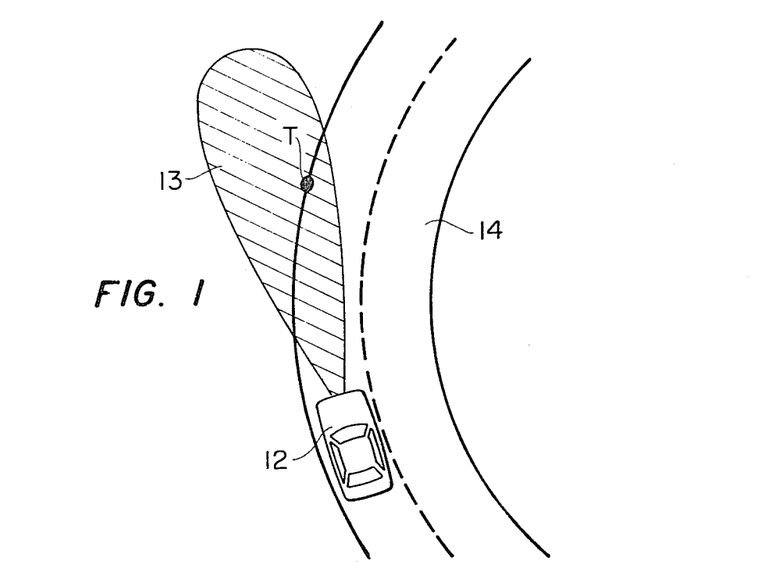
FIG. 1 shows relation between a target and the detection zone of a radar sensor.

Referring now to FIG. 1, the relation between a target T and the detection zone 13 of a radar sensor mounted on a vehicle 12 is schematically illustrated. The vehicle 12 is shown moving forward along a curved road 14 and the target T which stands on a side edge of the curved road 14 is shown inside of the detection zone 13. In this case, since the vehicle 12 is moving along the curved road 14 there is almost no possibility of collision with the target T, thus the radar sensor should not detect the target T as a dangerous obstacle.

Figures 2, 3:
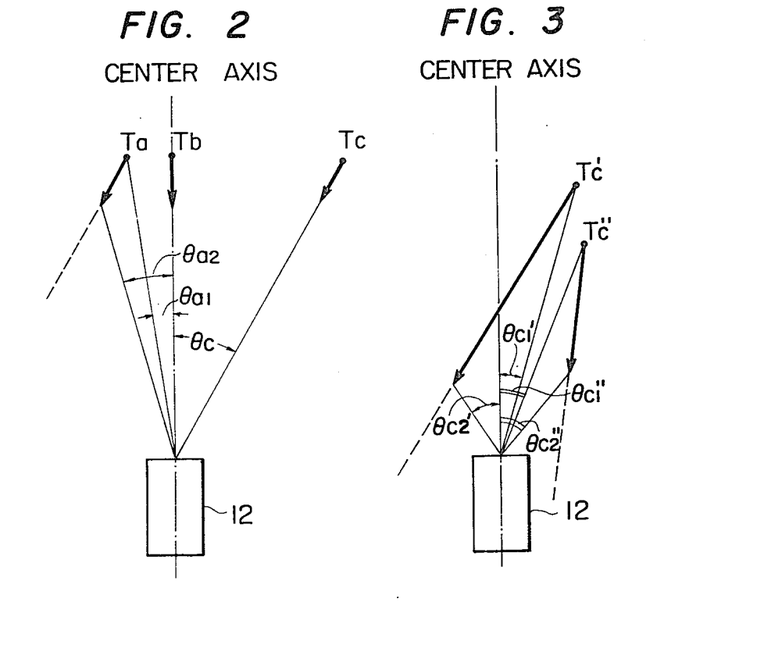
FIGS. 2 and 3 show relation between the angular displacement respectively of stationary and moving target from the center axis of the vehicle and the possibility of collision.

Reference is now made to FIGS. 2 and 3, which show the relation between various targets and the vehicle 12 analyzing the angular displacement of the targets from the center axis of the vehicle. However, for the sake of explanation in these figures it is assumed that the vehicle 12 which in fact is moving is not in motion and the targets which are in fact stationary are moving relative to the vehicle changing their positions as a function of time. In FIG. 2 there are three targets Ta, Tb and Tc in which Ta is at the left side of the curved road, Tb is directly ahead and on the center axis of the vehicle and Tc is at the right side of the vehicle and each of the three targets is moving in the directions indicated by the arrows shown in FIG. 2. The speed of these three targets is assumed to be equal to the speed of the vehicle, since the vehicle in this Figure is assumed to be stationary.

At the time $t = t_1$, the target Ta has an angular displacement $\theta_{a1}$ and after a small increment in time $\Delta t$ where $t = t_1 + \Delta t$, the target Ta has an angular displacement $\theta_{a2}$. Thus the variation rate of the angular displacement $\theta$ is as follows.

$$\frac{d\theta}{dt} = \frac{\theta_{a1} - \theta_{a2}}{\Delta t}$$

It is apparent from FIG. 2 that the value of the above equation is not zero. Since the absolute value of the angular displacement of the target Ta is increasing with the laps of time, the absolute value of the rate of variation of the angular displacement is also increasing. In this case the target Ta is not going to collide with the vehicle and as the vehicle is moving along the curved road as shown in FIG. 1 the target Ta will be out of the driver's sight after a certain period of time.

The target Tb is moving toward the vehicle along the center axis of the vehicle. At the time $t = t_1$, the target Tb has the angular displacement of zero and also it has the same angular displacement of zero after a small increment in time $\Delta t$ where $t = t_1 + \Delta t$, thus the target Tb will collide with the vehicle if it keeps moving. The rate of variation of the angular displacement of the target Tb is shown via the following equation.

$$\frac{d\theta}{dt} = \frac{0 - 0}{\Delta t} = 0$$

The target Tc is moving toward the vehicle from the right forward direction with the aforementioned speed. At the time $t = t_1$, the angular displacement is $\theta_c$ and if the target Tc maintains the same cource after a small increment in time $\Delta t$ where $t = t_1 + \Delta t$ the angular displacement will still be $\theta_c$. Therefore the target Tc will also collide with the vehicle if it continues moving. The rate of variation of the angular displacement of the target Tc is shown by the following equation.

$$\frac{d\theta}{dt} = \frac{\theta_c - \theta_c}{\Delta t} = 0$$

Reference is now made to FIG. 3, which shows the relation between vehicle 12 and a target Tc' which is moving at a speed greater than the vehicle if it were normally traversing the road and also the relation between the vehicle 12 and a target Tc" which is moving at a speed below that of the vehicle, where both Tc' and Tc" are at the right forward position of the vehicle. The variation rate of the angular displacement of these targets are given by following equations respectively.

$$\frac{d\theta}{dt} = \frac{\theta_{c1'} - \theta_{c2'}}{\Delta t} \neq 0, \quad \frac{d\theta}{dt} = \frac{\theta_{c1'} - \theta_{c2''}}{\Delta t} \neq 0$$

The values of the above equations showing the rate of variation of the angular displacement do not equal zero and indicate that these targets Tc' and Tc" will not collide with the vehicle 12.

It will be understood from above-mentioned consideration that when the target has a rate of variation of angular displacement given by $$\frac{d\theta}{dt} = 0,$$

there is a possibility of collision between the target and the vehicle.

Thus this means that it is possible to determine whether the target is moving toward the vehicle or not by detecting the rate of variation of the angular displacement of the target from the center axis of the vehicle.

Figure 4:
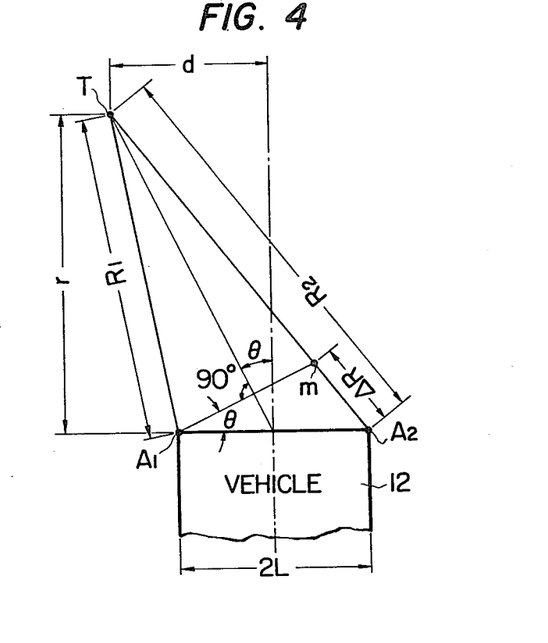
FIG. 4 shows relation between a target and a pair of antennas of a radar sensor mounted on a vehicle.

Reference is now made to FIG. 4, which shows the relation between the target T and the vehicle 12 with a radar system in which a pair of antennas $A_1$ and $A_2$ is mounted on the vehicle 12 spaced by a distance 2L.

In FIG. 4 "d" indicates a distance between the target T and the center axis of the vehicle 12, "$\theta$" indicates the angular displacement of the target T from the center axis, "r" indicates the distance between the target Ta and the vehicle 12 measured along the center axis and "$R_1$" and "$R_2$" indicate the distance between the target T and the antennas $A_1$ and $A_2$. By drawing a line $\overline{A_1 m}$ where $\overline{T A_1} = \overline{T m}$, the angle $\angle m A_1 A_2$ becomes equal to $\theta$ and since $\overline{A_2 m} = R_2 - R_1$ and $\overline{A_2 m}$ is indicated by $\Delta R$, the relation between $\Delta R$ and 2L can be shown as follows considering the angle $\theta$ is very small.

$$\frac{\Delta R}{2L} \approx \sin\theta$$

Further, since the value of $\theta$ is very small as mentioned above, the above approximation may be simplified to;

$$\frac{\Delta R}{2L} \approx \theta$$

The above formula shows that under this kind of condition the angular displacement of a target can be obtained approximately by the difference $\Delta R$ of the distances between the target T and the two antennas $A_1$ and $A_2$ mounted on the vehicle 12. Thus it will be possible to determine the angular displacement $\theta$ of the target T by obtaining said $\Delta R$ using a phase difference of microwave carriers.

However, though it is possible to detect the phase difference $\Delta\phi$ by means of the microwave carriers, the value of the phase difference $\Delta\phi$ can be within zero radian and $2\pi$ radians because of the division of the length of the propagation line by the number of waves of the microwave carrier, thus it is possible to define the absolute relation of the target T and the vehicle 12 instantaneously. However, by detecting the rate of variation of the phase difference as mentioned herein above, it will be possible to determine the direction of motion of the target ahead.

The Doppler radar system for the anti-collision system of a vehicle according to the present invention is based on this above-mentioned theory. The theory of the detection can be explained in other words, that is the difference $\Delta R$ of distance between the target T and two antennas $A_1$ and $A_2$ is detected by the phase difference $\Delta\phi$ of two microwave carriers received by the antennas $A_1$ and $A_2$ and the rate of variation of the angular displacement is detected by detecting the rate of variation of the phase difference.

Figure 5:
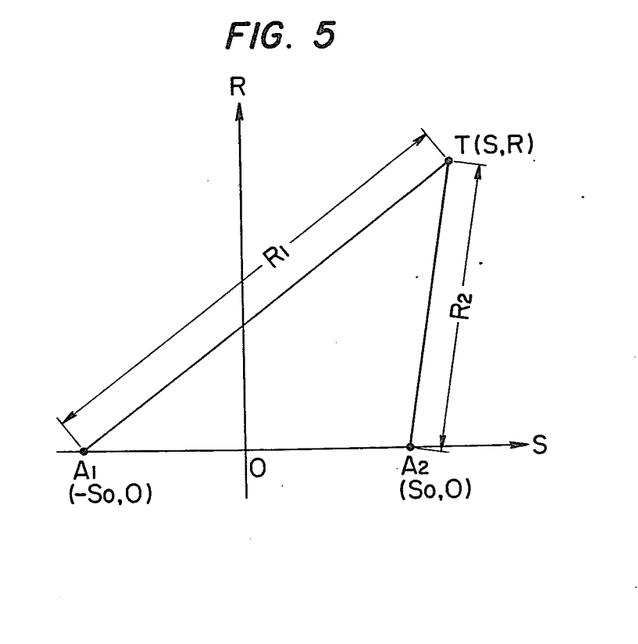
FIG. 5 is a co-ordinate diagram showing a relation between a target and a pair of antennas.

Reference is now made to FIG. 5, which is a co-ordinate diagram showing the relation between the target T and the two antennas $A_1$ and $A_2$. A pair of antennas $A_1$ and $A_2$ are on the S axis and the point midway between points $A_1$ and $A_2$ is the origin where the R axis crosses. The R axis is perpendicular on the S axis. The co-ordinates of the antennas $A_1$ and $A_2$ are $(-So, O)$ and $(So, O)$ and the co-ordinates of the target T is $(S, R)$.

In the co-ordinates of FIG. 5 where $\overline{A_1 T} = R_1$ and $\overline{A_2 T} = R_2$ $$R_1 = \sqrt{(S+So)^2 + R^2} \tag{1}$$

$$R_2 = \sqrt{(S-So)^2 + R^2} \tag{2}$$

Assuming that the difference between $R_1$ and $R_2$ is constant, the following equation can be derived where "a" is a constant.

$$\sqrt{(S+So)^2 + R^2} - \sqrt{(S-So)^2 + R^2} = 2a \tag{3}$$

From the above equation the following equation is obtained.

$$\frac{S^2}{a^2} - \frac{R^2}{(So^2 - a^2)} = 1 \tag{4}$$

The equation (4) is a formula of a hyperbola which is known well and the formula for deriving the asymptotes of the hyperbola is given by the following equation.

$$\frac{S}{a} = \pm \frac{R}{\sqrt{So^2 - a^2}} \tag{5}$$

On the other hand, if in operation a microwave signal is transmitted from the antenna $A_1$ and received by the same antenna after reflected in the target T, the phase $\phi_1$ of the received signal received at the antenna $A_1$ is given by the following equation where $\lambda$ is the wavelength of the microwave signal.

$$\phi_1 = \frac{2\pi}{\lambda} 2R_1 \tag{6}$$

In the same manner the phase $\phi_2$ of the received signal received at the antenna $A_2$ is given by the following equation.

$$\phi_2 = \frac{2\pi}{\lambda} (R_1 + R_2) \tag{7}$$

If the difference between the above two phases $\phi_1$ and $\phi_2$ is assumed as $\Delta\phi$, the following formula is obtained by using above-mentioned equations (1), (2), (3), (6) and (7).

$$a = \frac{\lambda}{4\pi} \Delta\phi \tag{8}$$

When the wavelength $\lambda$ of the microwave signal is given, the value of "a" can be derived by the above formula (8) corresponding to each value of the phase difference $\Delta\phi$, thus the asymptotes of the hyperbola can be derived by the formula (5).

Figure 6:
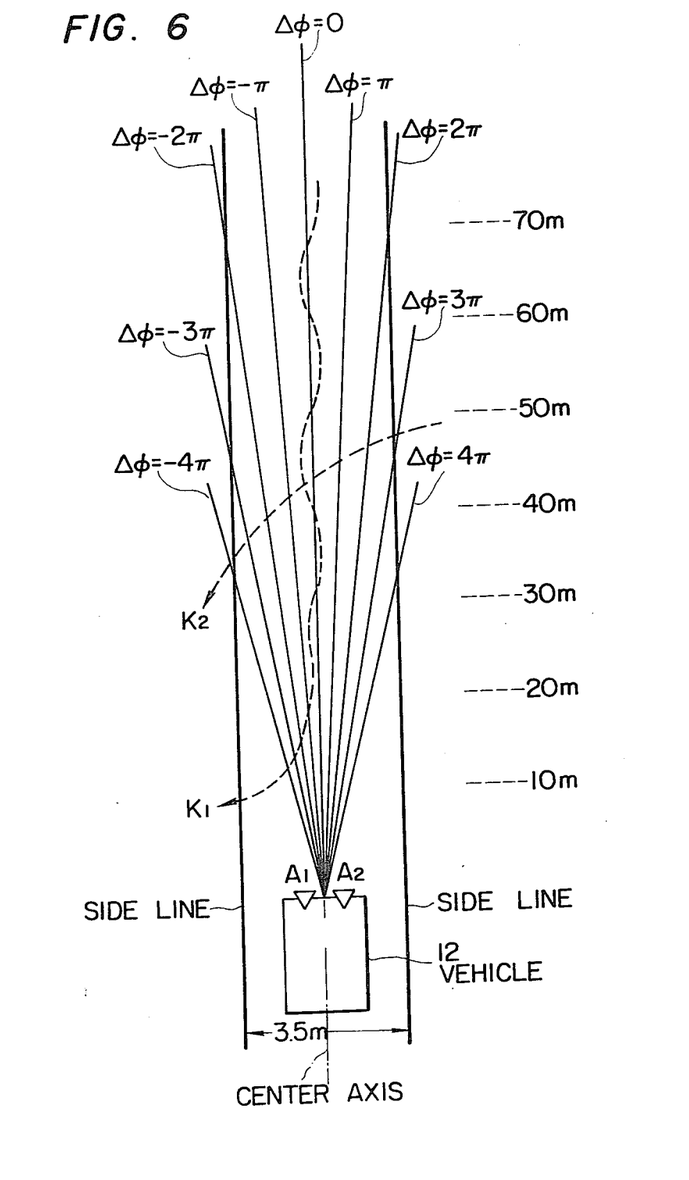
FIG. 6 is a phase difference chart of the radar system according to the present invention.

Reference is now made to FIG. 6, which is a phase difference chart plotted according to each value from $\Delta\phi$ where $\lambda = 3$ cm, $2L = 20\lambda = 60$ cm and $Wd = 3.5$ m where $Wd$ is the width of the road.

If a target is moving along the side line from a point of more than 80 meters ahead in the direction of the vehicle 12, the value of the phase difference $\Delta\phi$ between said two received echo signals is $2\pi$ radians when the target is 70 meters ahead, $3\pi$ radians when the target is 50 meters ahead and $4\pi$ radians when the target is 35 meters ahead.

Although the real value of the phase difference is varying as per the above-mentioned description, according to the differences in distance, the value of the phase difference itself detected at a certain instant is within a range of 0 radian to $2\pi$ radians.

A broken line $K_1$ indicates a locus of the phase difference actually measured, where the transmitted microwave signal is reflected by another vehicle moving toward the vehicle 12 along the center axis. In this case the value of the fluctuation of the phase difference is in a range of $\pm 2\pi$ radians.

Also a broken line $K_2$ indicates a locus of the phase difference obtained in the same manner, where the transmitted microwave is reflected by a target standing on the side edge of the road.

From the above theoretical explanation of the method of detecting the rate of variation of the angular displacement of a target according to the present invention it will be clear that a target with a radical rate of variation of the phase difference, in other words a target which moves across the asymptotes of the equal phase difference lines in the detection zone of the radar system frequently in a certain direction has no possibility of collision with the vehicle 12. However, a target which has a high frequency of crossing said asymptotes but the direction of said crossing always changes alternately so that the positive phase and the negative phase offset or negate each other, as a result, has the possibility of collision with the vehicle.

Figure 7:
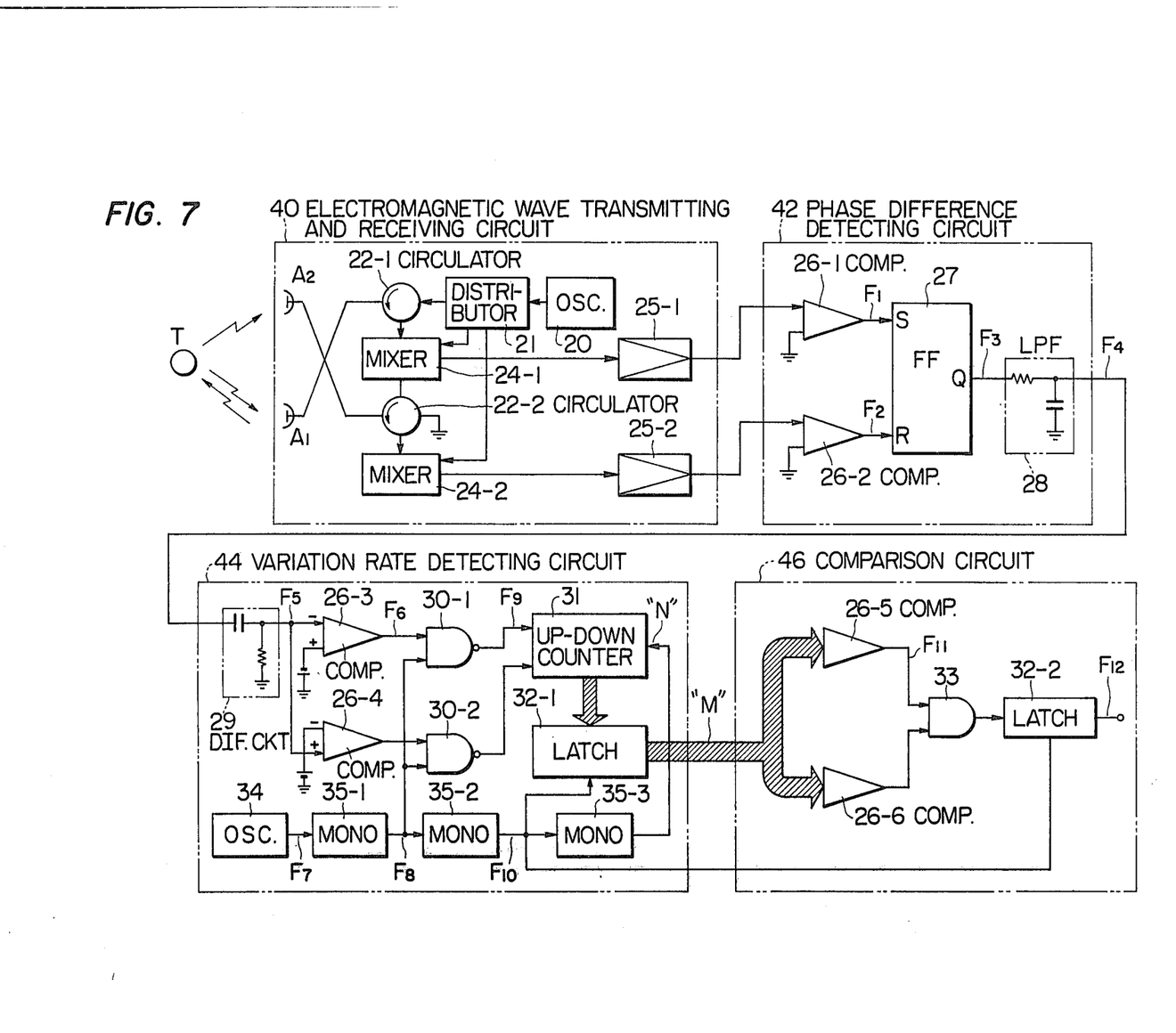
FIG. 7 shows the block diagram of the first embodiment of the Doppler radar system according to the present invention.
Figure 8:
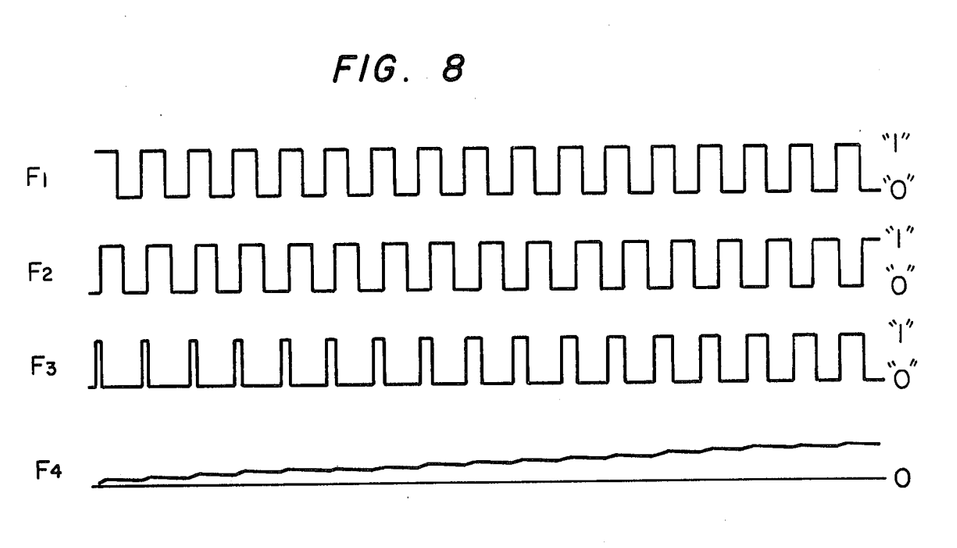
FIGS. 8 and 9 show waveform diagrams useful for describing the embodiment of FIG. 7 where the time axis drawn in FIG. 9 is reduced into about one twentieth of that shown in FIG. 8.
Figure 9:
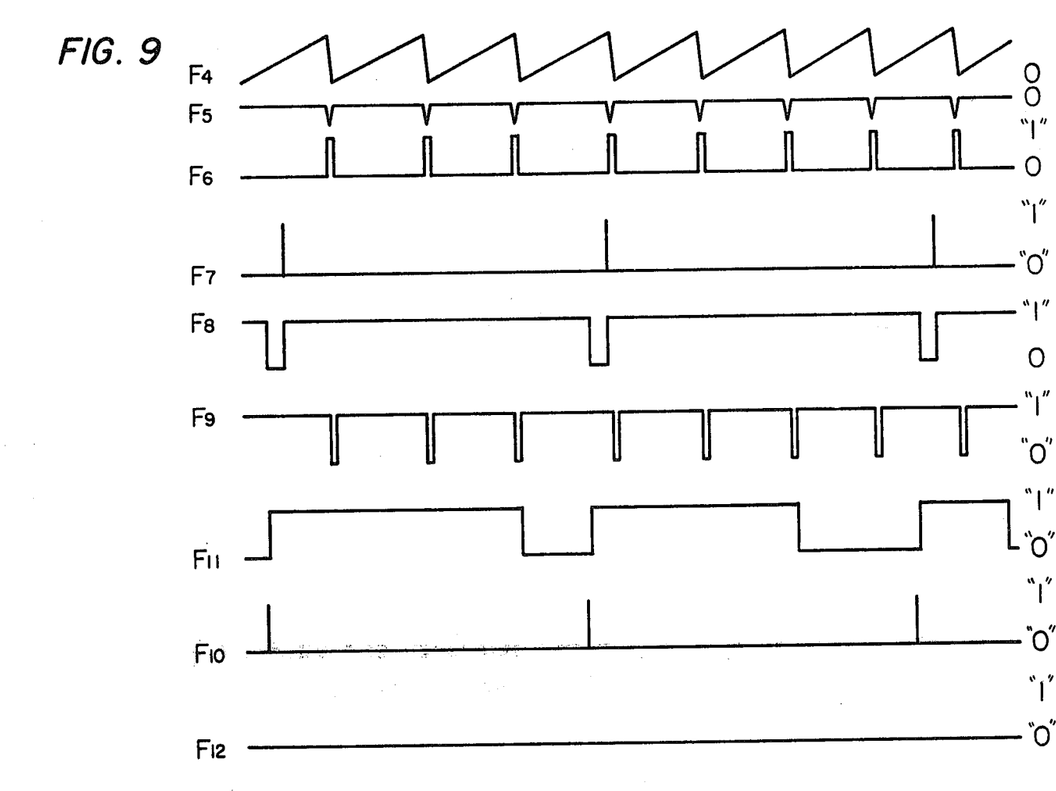

Reference is now made to FIGS. 7, 8 and 9 where FIG. 7 shows a first preferred embodiment according to the present invention while FIGS. 8 and 9 show waveform diagrams of the embodiment. Each waveform shown in FIGS. 8 and 9 is indicated by symbols $F_1$, $F_2$, $F_3$, etc which are also shown in FIG. 7.

The radar system according to the present invention basically comprises an electromagnetic wave transmitting and receiving circuit (40), a phase difference detecting circuit (42), a variation rate detecting circuit (44), and a comparison circuit (46).

The preferred embodiment shown in FIG. 7 comprises the four circuits (40), (42), (44) and (46) where the electromagnetic wave transmitting and receiving circuit (40) comprises an oscillator 20, a distributor 21, a pair of circulators 22-1, 22-2, a pair of antennas $A_1$, $A_2$, a pair of mixers 24-1, 24-2, and a pair of amplifiers 25-1, 25-2, the phase difference detecting circuit (42) comprises a pair of comparators 26-1, 26-2, a flip-flop circuit 27 and a low pass filter 28, the variation rate detecting circuit (44) comprises a differentiation circuit 29, a pair of comparators 26-3, 26-4, a pair of NAND gates 30-1, 30-2, an up-down counter 31, a latch 32-1, an oscillator 34 and first, second and third monostable multivibrators 35-1, 35-2, 35-3 and the comparison circuit (46) comprises a pair of comparators 26-5, 26-6, an AND gate 33 and a latch 32-2.

A microwave signal oscillated successively at a gun oscillator 20 is divided into three currents at a distributor 21, which supplies one of said currents to a transmitting and receiving antenna $A_1$ from which said microwave signal is transmitted, through a circulator 22-1 and the other two currents to mixers 24-1 and 24-2 to provide local oscillation power.

The microwave signal transmitted from the antenna $A_1$ is reflected by a target T and received by two antennas $A_1$ and $A_2$. The microwave signal received by the antenna $A_1$ is applied to the mixer 24-1 through the circulator 22-1 while the other microwave signal received at the antenna $A_2$ is applied to the mixer 24-2 through a circulator 22-2.

The antennas shown in FIG. 7 are assumed to be mounted on the vehicle as shown in FIG. 6 where the transmitting and receiving antenna $A_1$ is mounted on the port side of the vehicle 12 and the receiving antenna $A_2$ on the starboard side of the vehicle 12. The target is assumed to be the same target as described in FIG. 6 the locus of which is indicated by $K_2$.

The microwave signals received and supplied to mixers 24-1 and 24-2 are mixed with the local oscillation power signals and fed to produce a pair of Doppler signals respectively to Doppler amplifiers 25-1 and 25-2 where the Doppler signals are amplified respectively. Thus each Doppler signal has a frequency proportional to a relative velocity between the target and one of the antennas. Consequently the phase difference between two output signals of the amplifiers 25-1 and 25-2 is in proportion to the difference of the lengths of the propagation lines, said difference is the same as the difference $\Delta R$ of the distances to the target T from the transmitting and receiving antenna $A_1$ and from the receiving antenna $A_2$.

The output signals of the circuit (40) which are output signals of the amplifiers 25-1 and 25-2 are respectively applied to comparators 26-1 and 26-2 to be transformed into digital signals respectively, said digital signals being shown in FIG. 8 and are indicated by $F_1$ and $F_2$.

A flip-flop circuit 27 connected to the comparators 26-1 and 26-2 is used as a difference detector and is set with the leading edge of the pulse signal $F_1$ and is reset with the leading edge of the pulse signals $F_2$ so that the flip-flop circuit 27 produces a pulse width modulation output signal $F_3$ as its output signal as shown in FIG. 8. It is understood that the pulse width modulation output signal $F_3$ produced by the flip-flop circuit 27 is representative of the phase difference. Also an EXCLUSIVE OR gate (not shown) may be used as the difference detector. Said signal $F_3$ is applied to a low-pass filter 28 which is used as a D-A converter and which produces an analog signal according to the digital signal $F_3$, the analog signal is shown in FIG. 8 indicated by $F_4$, so that the magnitude of the analog signal $F_{14}$ increases and decreases according to the variation of the pulse width of the signal $F_3$. Since the pulse width represents the phase difference, the length of the pulse width is zero when the phase difference is either 0 or $2\pi$ radians. Consequently, the magnitude of the analog signal becomes zero when the phase difference is either 0 or $2\pi$ radians.

FIG. 9 shows waveforms wherein the time axes thereof are one twentieth of the time axes shown in FIG. 8.

The variation of the increase and decrease in magnitude of the signal $F_4$ is detected by a differentiation circuit 29 connected to the circuit (42) to provide pulses $F_5$ in response to the signal $F_4$. Because of the above, the pulses $F_5$ are produced at each $2\pi$ radians of the variation of the magnitude of the analog signal $F_4$. The pulses $F_5$ are supplied to both comparators 26-3 and 26-4 where the comparator 26-3 produces a rectangular positive pulse train signal $F_6$ with the negative pulses $F_5$ and the comparator 26-4 produces a rectangular positive pulse train signal, which is not shown, with positive pulses which are not shown also. Under the condition of the movement of the target T as previously described, only the comparator 26-3 is actuated thus the rectangular positive pulse train signal $F_6$ is obtained.

Namely, when a target is moving across an asymptote of $2n\pi$ shown in FIG. 7 in the direction from right to left seen from the direction of the vehicle, where "n" is $\pm 1, 2, 3, \ldots$, the comparator 26-3 is actuated and when a target is moving from left to right in the same manner the comparator 26-4 is actuated.

The outputs of the comparator 26-3 and 26-4 are connected to inputs of NAND gates 30-1 and 30-2 and these applied signals are used at a certain period of time as described hereinafter.

An oscillator 34 produces an oscillation signal $F_7$ and a monostable multivibrator 35-1 produces a gate signal $F_8$ according to the signal $F_7$. The gate signal $F_8$ is applied to the NAND gates 30-1 and 30-2 to control the NAND gates 30-1 and 30-2 by providing a time reference. Thus the output signal $F_9$ of the NAND gate 30-1 becomes "0" when both signals $F_6$ and $F_8$ are "1" and the output signal $F_9$ is applied to an ADD line input terminal of an up-down counter 31. On the other hand the output of the NAND gate 30-2 is connected to a SUBSTRACT line input terminal of the up-down counter 31 so that an "answer" signal is produced which has a number "M" of pulses where said number represents the numerical difference between the pulse train signals supplied by the pair of NAND gates 30-1 and 30-2 respectively.

Another monostable multivibrator 35-2 connected to the monostable multivibrator 35-1 produces a pulse signal $F_{10}$ according to the output signal of the monostable multivibrator 35-1 where the output signal $F_{10}$ produced by the monostable multivibrator 35-2 is supplied to another monostable multivibrator 35-3 and latches 32-1 and 32-2 for providing a time reference.

The monostable multivibrator 35-3 produces a preset signal with which a predetermined number "N" is preset in the up-down counter 31.

Furthermore, the output signal of the up-down counter 31 is transferred to the latch 32-1 by the pulse signal $F_{10}$ which is supplied from the monostable multivibrator 35-2 after a predetermined period of time. The output signal of the circuit (44), i.e., the output signal of the latch 32-1, is then applied to a pair of comparators 26-5 and 26-6 and the numer "M" of pulses included in the output signal of the circuit (44) is compared with a pair of predetermined numbers for example N + 3 and N − 3.

As the result of this comparison, the comparator 26-5 issues an output signal $F_{11}$ when "M" < N + 3 and the comparator 26-6 issues an output signal when "M" > N − 3.

These two signal produced by the comparators 26-5 and 26-6 are supplied to an AND gate 33 which produces at its output a logic value "1" in a signal $F_{12}$ (which is not shown in FIG. 9 because FIG. 9 shows only normal safe driving case) as an alarm signal which can be supplied to an anti-collision system providing information of a target ahead when N − 3 < "M" < N + 3. This means the phase difference does not have a variation greater than $2\pi$ radians multiplied by 3 during the predetermined period of time defined by the output signal $F_8$ of the monostable multivibrator 35-1. Under the conditions described herein before there is a variation over $2\pi$ radians multiplied by 3 since the target T is not moving toward the vehicle so that the AND gate 33 does not produce the logic value "1" which is to be supplied to the anti-collision system.

Figure 10:
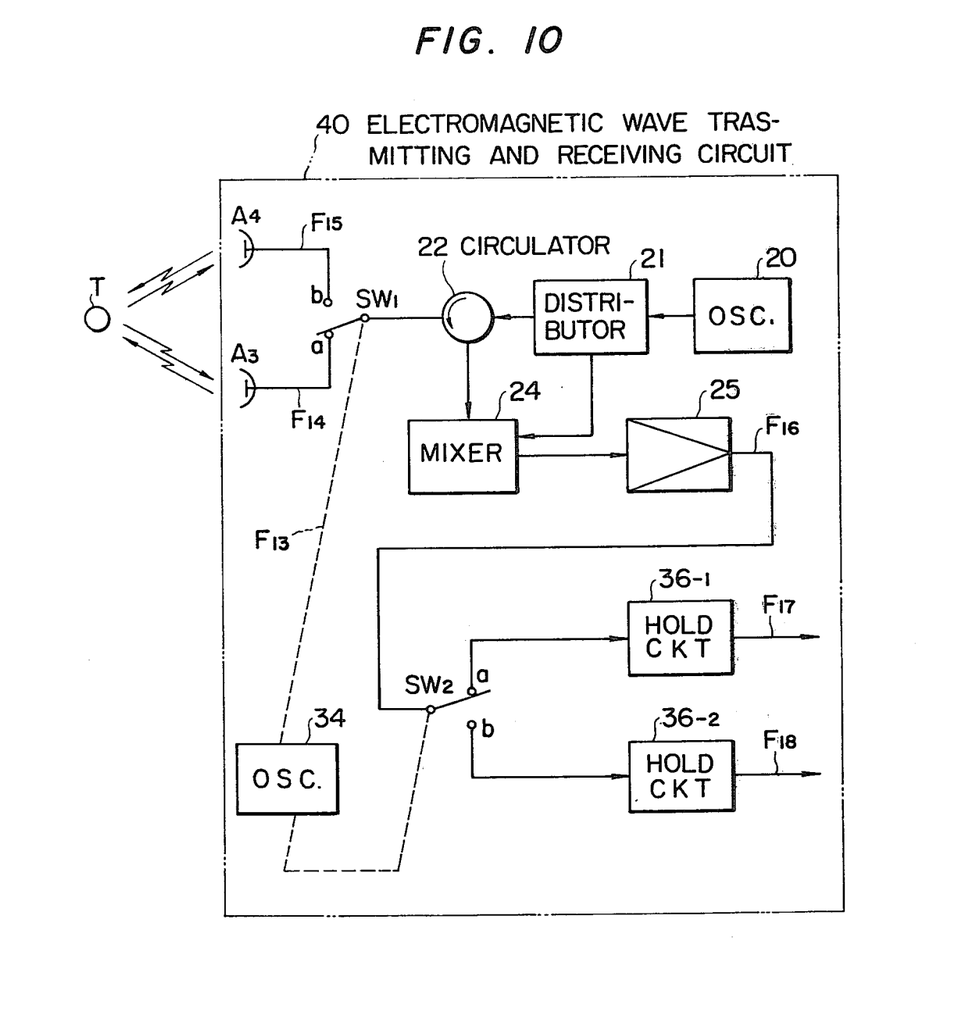
FIG. 10 shows the block diagram of the second embodiment of the Doppler radar system according to the present invention.
Figure 11:
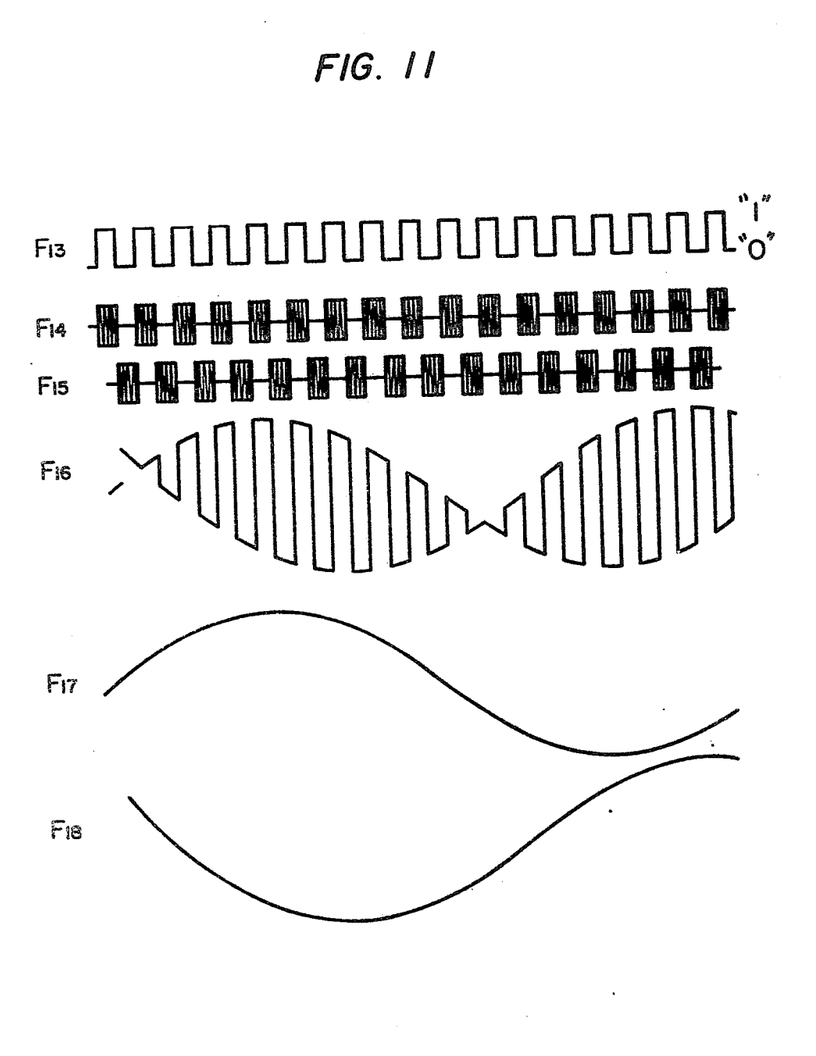
FIG. 11 shows a waveform diagram useful for describing the embodiment shown in FIG. 10.

FIG. 10 shows a block diagram of a second embodiment of a microwave transmitting and receiving circuit (40) according to this present invention and FIG. 11 shows a waveform diagram useful for describing the embodiment shown in FIG. 10. Each waveform shown in FIG. 11 is indicated by symbols $F_{13}$, $F_{14}$, $F_{15}$ etc which correspond with the same numbers shown in FIG. 10. In this second embodiment of an electromagnetic wave transmitting and receiving circuit (40), the radar receiving device does not need a pair of circulators, a pair of mixers nor a pair of amplifiers thus the radar receiving device includes a single circulator 22, a single mixer 24 and a single amplifier 25. Two antennas $A_3$ and $A_4$ are both for transmitting and receiving and are switched by a microwave switch $SW_1$ respectively so that one of the two antennas is able to transmit and receive a microwave signal simultaneously while the other antenna is disabled.

In FIG. 10, a microwave signal issued from a gun oscillator 20 is transmitted from one of antennas $A_3$ and $A_4$ through a distributor 21, a circulator 22 and the microwave switch $SW_1$. If in operation, the switch $SW_1$ is thrown into "a" position as shown in FIG. 10, the microwave signal is transmitted from the antenna $A_3$. A part of the produced microwave signal produced at the oscillator 20 is applied to the mixer as a source of local oscillation power through the distributor 21.

The microwave switch $SW_1$ and another switch $SW_1$ connected to the amplifier 25 are controlled by a interlocking oscillation signal $F_{13}$ which is produced at an oscillator 34 used as a switching signal generator, the switches $SW_1$ and $SW_2$ are designed to be thrown to the contact point "a" when the oscillation signal $F_{13}$ has a logic value "1".

Under the condition that the switches are thrown to the contact points indicated by "a", a transmitted microwave signal from the antenna $A_3$ is received by the same antenna $A_3$ after reflected by a target T ahead. The received echo signal is applied to the mixer 24 through the switch $SW_1$ and the circulator 22.

On the other hand, when the output signal $F_{13}$ of the oscillator 35 is "0", the switches $SW_1$ and $SW_2$ are thrown to contacts "b" so that the received signal from the transmitting and receiving antenna $A_4$ is transformed into a discontinuous Doppler signal as different from the first embodiment wherein a pair of continuous Doppler signals are produced.

The mixer 24 produces a signal which contains a pair of discontinuous Doppler signals and the signal produced by the mixer 24 is supplied to the amplifier 25 to be amplified. Thus an amplified signal $F_{16}$ is produced at the amplifier 25 and this amplified signal $F_{16}$ is applied to a pair of hold circuit 36-1, 36-2 through the switch $SW_2$. The pair of discontinuous Doppler signals is smoothed and thus demodulated to a pair of Doppler signals the waveforms of which are shown in FIG. 11 indicated by $F_{17}$, $F_{18}$.

It is understood that the hold circuits are used as low frequency signal separators so that a pair of low-pass filters may be used instead of the hold circuit.

The second preferred embodiment shows that a single radar receiving device is able to function in place of the two shown in the first embodiment with equal effect.

The demodulated output of the Doppler signals obtained in the second embodiment may be applied to the comparators 26-1 and 26-2 of the first embodiment to accomplish a radar system which provides the same effect.

Since each antenna is alternately transmitting and receiving microwave signals respectively, the difference P of the two propagation lengthes of the two microwave signals received by the antennas $A_3$ and $A_4$ is doubled as compared with the first embodiment. This feature is given by the following equation when $A_3$ and $A_4$ are used instead of $A_1$ and $A_2$ of FIG. 4.

$$P = 2(R_1 - R_2)$$

Because the difference P is doubled, the asymptotes shown in FIG. 6 where $\Delta\phi = \pi, 2\pi, 3\pi, \ldots n\pi$ are to be changed to $\Delta\phi = 2\pi, 4\pi, 6\pi, \ldots 2n\pi$. Consequently, the number of asymptotes are doubled in the same area, in other words the number of asymptotes in the same angle is twice that of the first embodiment.

What is claimed is:

1. A Doppler radar system for an anti-collision system of a vehicle, comprising:
   first means for transmitting an electromagnetic wave in a direction of movement of said vehicle and for receiving a corresponding echo wave reflected from a target at first and second points spaced from each other to produce first and second Doppler signals in accordance with said reflected echo wave, said first and second points being positioned respectively on port and starboard sides of said vehicle, said first Doppler signal having a frequency proportional to the relative velocity between said target and said first point, said second Doppler signal having a frequency proportional to the relative velocity between said target and said second point;
   second means responsive to said first means for producing a first signal indicative of a difference in phase between said first and second Doppler signals, the magnitude of said first signal increasing when the frequency increase rate of said second Doppler signal is greater than that of said first Doppler signal and decreasing when the frequency increase rate of said second Doppler signal is less than that of said first Doppler signal;

third means responsive to said second means for producing a first pulse signal each time the magnitude of said first signal increases and a second pulse signal each time the magnitude of said first signal decreases, said first and second pulse signals being produced separately;

fourth means for permitting respectively the transmission of said first and second pulse signals for a predetermined period of time;

fifth means for up counting said first pulse signals and for down counting said second pulse signals; and sixth means for producing an alarm signal in accordance with the number of pulses stored in said fifth means.

2. A Doppler radar system for an anti-collision system of a vehicle as claimed in claim 1, wherein said first means comprises:

electromagnetic wave generating means for generating said electromagnetic wave;

a Doppler signal generator;

two transmitting and receiving antennas positioned respectively at said first and second points for transmitting said electromagnetic wave supplied thereto and receiving said echo wave;

first switch means for selectively connecting either one of said antennas to said electromagnetic wave generating means and said Doppler signal generator in response to a switching signal;

two low frequency signal separators for passing therethrough only a relatively low frequency component of an input signal thereto, each of said low frequency separators including a holding circuit for holding a level of an input signal supplied thereto until a succeeding input signal is supplied thereto;

second switch means for selectively supplying said Doppler signal generator to either one of said two low frequency signal separators in response to said switching signal; and a switching signal generator for producing said switching signal with a frequency which is lower than that of said electromagnetic wave and higher than that of said Doppler signals.

3. A Doppler radar system for an anti-collision system of a vehicle as claimed in claim 1, wherein said first signal has a wavelength which represents the period of time during which said difference in phase between said pair of Doppler signals varies from 0 to $2\pi$ radians or from $2\pi$ radians to 0.

4. A Doppler radar system as claimed in claim 1, wherein said third means comprises:

a differentiation circuit for differentiating an analog signal supplied from said second means to produce a pulse train signal having a negative value when the magnitude of said supplied analog signal drops after an increase and a pulse train signal having a positive value when the magnitude of said supplied analog signal rises after a decrease; and first and second comparators responsive to said differentiation circuit, said first comparator producing an output pulse signal when the negative value of said pulse signal applied from said differentiation circuit is below a first predetermined value, said second comparator producing an output pulse signal when the positive value of said pulse signal applied from said differentiation circuit is above a second predetermined value.

5. A Doppler radar system as claimed in claim 4, wherein said fourth means comprises:

first and second gate circuits responsive respectively to said first and second comparators; and a timer circuit for providing a predetermined period of time, the output of said timer circuit being fed to said first and second gate circuits for enabling respectively the first and second gate circuits for said predetermined period of time.

6. A Doppler radar system as claimed in claim 1, wherein said fifth means comprises:

an up-down counter, an ADD line input and a SUBTRACT line input of which are responsive respectively to said first and second pulse signals applied from said fourth means;

means for presetting a predetermined number into said up-down counter each time the number stored in said up-down counter is refreshed; said up-down counter producing an output signal by adding the number of pulses fed to said ADD line input to said predetermined number and subtracting the number of pulses fed to said SUBTRACT line input from said predetermined number so that the output signal of said up-down counter indicates a number equal to the numerical difference of pulses between said first and second pulses;

a latch responsive to the output signal of said up-down counter for storing the output signal for a predetermined period of time; and a timer circuit responsive to said latch for providing said predetermined period of time.

7. A Doppler radar system as claimed in claim 1, wherein said sixth means comprises:

a first comparator for producing an output signal when the number of pulses applied from said fifth means exceeds a first predetermined value;

a second comparator for producing an output signal when the number of pulses applied from said fifth means is below a second predetermined value which is greater than said first predetermined value; and gate means responsive to the output signals of said first and second comparators for producing an output signal when both of the output signals are simultaneously fed thereto.

8. A Doppler radar system for an anti-collision system of a vehicle as claimed in claim 1, wherein said second means comprises:

a pair of A-D converters which convert said first and second Doppler signals into a pair of digital signals respectively;

a difference detector connected to said pair of A-D converters, for detecting the difference in phase of said pair of digital signals to produce a single digital signal in response to said difference in phase; and a D-A converter connected to said difference detector, for producing a single analog signal in response to said single digital signal obtained by said difference detector.

9. A Doppler radar system for an anti-collision system of a vehicle as claimed in claim 4, wherein said A-D converters are a pair of comparators each of which produces a first logic signal when the magnitude of said Doppler signal is over a predetermined value and which produces a second logic signal when the magnitude of said Doppler signal is less than said predetermined value.

10. A Doppler radar system for an anti-collision system of a vehicle as claimed in claim 4, wherein said difference detector is a pulse width modulation signal generator for producing a pulse width modulation signal proportional to the difference in phase between said pair of digital signals.

11. A Doppler radar system for an anti-collision system of a vehicle as claimed in claim 4, wherein said difference detector is a flip-flop circuit producing a pulse of which width is proportional to the difference in phase between said pair of digital signals.

12. A Doppler radar system for an anti-collision system of a vehicle as claimed in claim 4, wherein said difference detector is an EXCLUSIVE OR gate for producing a pulse the width of which is proportional to the difference in phase between said pair of digital signals.

13. A Doppler radar system for an anti-collision system of a vehicle as claimed in claim 4, wherein said D-A converter is a low pass filter for producing said single analog signal.

* * * * *